(12) United States Patent
Greenprice (10) Patent No.: US 11,304,559 B2
(45) Date of Patent: Apr. 19, 2022

(54) COOKING APPARATUS

(71) Applicant: Eltedric Alonzo Greenprice, San Antonio, TX (US)

(72) Inventor: Eltedric Alonzo Greenprice, San Antonio, TX (US)

(*) Notice: Subject to any disclaimer, the term of this patent is extended or adjusted under 35 U.S.C. 154(b) by 172 days.

(21) Appl. No.: 16/506,976

(22) Filed: Jul. 9, 2019

(65) Prior Publication Data

US 2020/0008613 A1    Jan. 9, 2020

Related U.S. Application Data

(60) Provisional application No. 62/695,822, filed on Jul. 9, 2018.

(51) Int. Cl.
*A47J 36/16*    (2006.01)
*A47J 27/10*    (2006.01)
*A47J 27/00*    (2006.01)

(52) U.S. Cl.
CPC .............. *A47J 36/16* (2013.01); *A47J 27/10* (2013.01); *A47J 2027/006* (2013.01)

(58) Field of Classification Search
CPC ....... A47J 2027/006; A47J 27/10; A47J 36/16
USPC .......................................................... 99/403
See application file for complete search history.

(56) References Cited

U.S. PATENT DOCUMENTS

| 4,166,139 A | * | 8/1979 | Ishida | A21B 5/08 |
| | | | | 426/115 |
| 4,171,739 A | * | 10/1979 | Yamato | A23L 3/001 |
| | | | | 198/704 |
| 4,185,125 A | * | 1/1980 | Sakakibara | A23L 5/11 |
| | | | | 426/439 |
| 4,234,612 A | * | 11/1980 | Sakakibara | A47J 37/1214 |
| | | | | 426/394 |
| 6,095,035 A | * | 8/2000 | Zittel | A23B 7/158 |
| | | | | 134/132 |

(Continued)

FOREIGN PATENT DOCUMENTS

| JP | 10004901 | * | 1/1998 |
| JP | 10094374 | * | 4/1998 |

(Continued)

OTHER PUBLICATIONS

Translation JP201573797 (Year: 2021).*

*Primary Examiner* — Joel M Attey
*Assistant Examiner* — Frederick F Calvetti
(74) *Attorney, Agent, or Firm* — Shah IP Law, PLLC; Samar Shah (57) ABSTRACT

An apparatus for cooking noodles is disclosed herein. The apparatus permits a user to cook lasagna noodles safely and effectively, while minimizing danger and minimizing the amount of work that the user must perform. More specifically, the apparatus of the present invention is for a sleeve with an interior pocket that can accommodate a lasagna noodle. Once a noodle is placed within the sleeve, the sleeve can be placed in a pot of boiling water to cook the noodle. The sleeve ensures that the noodle cooks appropriately in a variety of different pots, including smaller pots without causing the noodle to break. Moreover, the sleeve prevents the noodles form sticking to each other and to the pot. Once cooked, the noodles may be easily removed from the sleeve for consumption or additional preparation.

9 Claims, 4 Drawing Sheets

(56) References Cited

U.S. PATENT DOCUMENTS

| | | | |
|---|---|---|---|
| 6,395,317 B1 * | 5/2002 | Singh | B65B 61/188 |
| | | | 206/5 |
| 7,597,044 B2 * | 10/2009 | Oh | A47J 37/1271 |
| | | | 208/134 |
| 8,866,056 B2 * | 10/2014 | Shapiro | B65D 81/3205 |
| | | | 219/735 |
| 9,060,642 B1 * | 6/2015 | Armbrust | A47J 36/08 |
| 9,346,603 B2 * | 5/2016 | De Busser | B65D 75/5805 |
| 10,435,198 B2 * | 10/2019 | Turcotte | B65D 25/00 |
| 10,517,323 B1 * | 12/2019 | Gray | A23P 10/30 |
| 2003/0124213 A1 * | 7/2003 | Ancona | A47J 27/10 |
| | | | 425/208 |
| 2006/0272513 A1 * | 12/2006 | Oh | A47J 37/1271 |
| | | | 99/403 |
| 2010/0263552 A1 * | 10/2010 | Hendrickson | A47J 27/10 |
| | | | 99/416 |
| 2015/0257573 A1 * | 9/2015 | Gabara | A47J 27/16 |
| | | | 99/337 |
| 2015/0342391 A1 * | 12/2015 | Seo | A47J 27/18 |
| | | | 99/331 |
| 2018/0127192 A1 * | 5/2018 | Cohen | G07F 11/1657 |
| 2019/0133371 A1 * | 5/2019 | Bavuso, Jr. | A47J 37/01 |
| 2019/0352069 A1 * | 11/2019 | Chen | B32B 7/02 |

FOREIGN PATENT DOCUMENTS

| | | | |
|---|---|---|---|
| JP | 100117933 | * | 5/1998 |
| JP | 2002302154 | * | 10/2002 |
| JP | 201573797 | * | 4/2015 |
| JP | 2017113608 | * | 6/2017 |

* cited by examiner

COOKING APPARATUS

CROSS-REFERENCE TO RELATED APPLICATIONS

This application claims priority to U.S. Provisional Patent Application Ser. No. 62/695,822, filed Jul. 9, 2018 entitled "Novel Lasagna Noodle Cooking Device, Apparatus." The entire content of that application is incorporated herein by reference.

BACKGROUND

Field of the Art

The present invention relates to cooking apparatuses. More specifically, the present invention relates to cooking pasta noodles.

Discussion of the State of the Art

There are a variety of methods for cooking sheets or ribbons of pasta, including large or small flat sheets of pasta, narrower "ribbons" of pasta, sheets or ribbons of pasta with ruffled surfaces, sheets or ribbons of pasta that are serrated, etc. (the various types of pasta—including pasta noodles that are not specifically listed herein—are generally referred to herein as "lasagna noodles" for ease of reference and convenience. However, the term "lasagna noodles" is not intended to be limiting). Traditionally, most people cook lasagna noodles by placing uncooked noodles into boiling water, and occasionally stirring the water throughout.

The traditional approach works reasonably well, but it is often undesirable for a variety of reasons. For one, users generally need a very large pot of boiling water to adequately cook all the noodles for a lasagna dish. However, not everyone has access to readily available large pots that are sufficient to cook the amount of noodles needed to prepare a lasagna dish without breaking the noodles. As a result, users typically cook lasagna noodles in smaller batches, which adds to the prep time.

Traditional cooking approaches also require a user to stir the cooking water, while the noodles are cooking, throughout the entire cooking process. Generally, lasagna noodles tend to stick to one another when they are being cooked. As a result, a user typically must stir the noodles, which is a time consuming and laborious task.

The traditional cooking approach is also potentially dangerous. For example, the traditional approach requires a user to pour out boiling water when the cooking process is complete in order to prevent the noodles from overcooking. However, the cooking pot is typically hot to the touch, which can burn the user. Moreover, this process typically causes steam to release towards the user's face, and removed water to splatter on the user's hands and body, both of which can cause burn related injuries.

Some have tried to alleviate these challenges by removing the boiling step in the cooking process. For example, "oven ready" lasagna noodles, which do not have to be cooked in boiling water are now being sold. These noodles can be assembled and placed in an oven without requiring additional cooking. These oven ready noodles overcome many of the challenges listed above. However, these noodles are not widely accepted in the marketplace because they tend to be more expensive, tend to have inferior flavor and texture as compared with freshly boiled lasagna noodles, and don't offer the same variety (in terms of shape, texture, and flavor) and control (in terms of desired cooked texture) to the buyers as available with traditional noodles.

As outlined above, traditional methods for cooking lasagna noodles are not satisfactory because they require specialized cooking utensils that are not always readily available, require significant time and effort, and are potentially dangerous. None of the available solutions overcome these issues while still allowing a user to enjoy noodles that are both flavorful and have a desirable texture.

SUMMARY

The present invention overcomes the challenges described above by providing an apparatus that allows a user to cook lasagna noodles safely and effectively, while minimizing danger and minimizing the amount of work that the user must perform.

More specifically, the apparatus of the present invention is for a sleeve with an interior pocket that can accommodate a lasagna noodle. Once a noodle is placed within the sleeve, the sleeve can be placed in a pot of boiling water to cook the noodle. The sleeve ensures that the noodle cooks appropriately in a variety of different pots, including smaller pots without causing the noodle to break. Moreover, the sleeve prevents the noodles form sticking to each other and to the pot. As such, the apparatus of the present invention minimizes the amount of stirring that a user must perform while cooking the noodles. The features of the present invention also enable a user to remove the sleeves from the boiling water once the noodles are cooked. As such, the user does not need to lift the hot pot of boiling water and pour out hot water, which can be dangerous for the reasons described above. In accordance with the inventive features of the present invention, the cooked noodles can then slide out of the sleeve and ready to be used to finish the lasagna dish.

A variety of different implementations of the present invention are envisioned, which are described herein and fall within the scope of the present invention. In one embodiment of the invention, the lasagna noodles may be pre-packaged in the apparatus, and do not need to be slid into the apparatus.

In one embodiment of the invention, the apparatus may contain or be comprised of additional food elements that would enhance the flavor or cooking process for the user. For example, the apparatus may include dried herbs, spices or freeze dried, dried or dehydrated vegetables or fungi.

For the purposes of brevity, the present invention is described as a lasagna noodle cooker; however, the noodle cooker may be used for other types of noodles or other food staples as would be apparent and readily understood by a person of ordinary skill in the art without departing from the scope of the invention. Moreover, other food items—other than pasta—may be cooked in the inventive apparatus of the present invention without departing from the scope of the invention.

Generally, the inventive apparatus is for an apparatus for cooking noodles, the apparatus comprising: a top layer; a bottom layer, enclosure seals for attaching the top layer to the bottom layer around the circumference of the apparatus, the enclosure seals creating an interior pocket within the top layer and the bottom layer; an insertion point creating an opening to access the interior pocket, wherein the insertion point being large enough to accommodate a noodle in at least one orientation; and an opening disposed on the top and/or the bottom layer, wherein the opening permitting liquid and/or gasses to enter and/or exit the interior pocket of the apparatus; wherein, the apparatus prevents the noodles that are placed within the apparatus from sticking to each other during the cooking process.

The apparatus further comprising a drainage element for permitting liquid and/or gases to enter and/or exit the apparatus. The apparatus further comprising a connection element connecting the apparatus to other apparatuses along an edge of the apparatus. The disclosed apparatus, wherein multiple interior pockets may be disposed within the apparatus. The apparatus further comprising a middle layer disposed between the top layer and the bottom layer, the middle layer creating additional interior pockets within the apparatus. The disclosed apparatus, wherein the enclosure seals prevent liquids and/or gases from entering and/or exiting the apparatus through the enclosure seals. The apparatus, wherein the insertion point further comprising an enclosure mechanism for preventing a noodle from accidentally exiting the apparatus. The apparatus, wherein the enclosure mechanism further comprising a flap that folds over the top layer at the insertion point to prevent a noodle from exiting the apparatus. The apparatus, wherein a plurality of openings are disposed on the top layer and the bottom layer. The apparatus, wherein the openings are smaller than the length and the width of the noodle, the opening designed to prevent the noodle from exiting the apparatus through the opening. The apparatus, wherein the top layer and the bottom layer serve as retention portions to prevent the noodle from contacting other noodles that may be nearby. The apparatus further comprising a lifting element for lifting the apparatus from a cooking enclosure. The apparatus, wherein the lifting apparatus may be comprised of a hook that may mate to a kitchen utensil.

BRIEF DESCRIPTION OF THE DRAWING FIGURES

The accompanying drawings illustrate several embodiments and, together with the description, serve to explain the principles of the invention according to the embodiments. It will be appreciated by one skilled in the art that the particular arrangements illustrated in the drawings are merely exemplary and are not to be considered as limiting of the scope of the invention or the claims herein in any way.

DETAILED DESCRIPTION

The invention is described by reference to various elements herein. It should be noted, however, that although the various elements of the inventive apparatus are described separately below, the elements need not necessarily be separate. The various embodiment may be interconnected and may be cut out of a singular block or mold. The variety of different ways of forming an inventive apparatus, in accordance with the disclosure herein, may be varied without departing from the scope of the invention.

Generally, one or more different embodiments may be described in the present application. Further, for one or more of the embodiments described herein, numerous alternative arrangements may be described; it should be appreciated that these are presented for illustrative purposes only and are not limiting of the embodiments contained herein or the claims presented herein in any way. One or more of the arrangements may be widely applicable to numerous embodiments, as may be readily apparent from the disclosure. In general, arrangements are described in sufficient detail to enable those skilled in the art to practice one or more of the embodiments, and it should be appreciated that other arrangements may be utilized and that structural changes may be made without departing from the scope of the embodiments. Particular features of one or more of the embodiments described herein may be described with reference to one or more particular embodiments or figures that form a part of the present disclosure, and in which are shown, by way of illustration, specific arrangements of one or more of the aspects. It should be appreciated, however, that such features are not limited to usage in the one or more particular embodiments or figures with reference to which they are described. The present disclosure is neither a literal description of all arrangements of one or more of the embodiments nor a listing of features of one or more of the embodiments that must be present in all arrangements.

Headings of sections provided in this patent application and the title of this patent application are for convenience only and are not to be taken as limiting the disclosure in any way.

Devices and parts that are connected to each other need not be in continuous connection with each other, unless expressly specified otherwise. In addition, devices and parts that are connected with each other may be connected directly or indirectly through one or more connection means or intermediaries.

A description of an aspect with several components in connection with each other does not imply that all such components are required. To the contrary, a variety of optional components may be described to illustrate a wide variety of possible embodiments and in order to more fully illustrate one or more embodiments. Similarly, although process steps, method steps, or the like may be described in a sequential order, such processes and methods may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the embodiments, and does not imply that the illustrated process is preferred. Also, steps are generally described once per aspect, but this does not mean they must occur once, or that they may only occur once each time a process, or method is carried out or executed. Some steps may be omitted in some embodiments or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other embodiments need not include the device itself.

Techniques and mechanisms described or referenced herein will sometimes be described in singular form for clarity. However, it should be appreciated that particular embodiments may include multiple iterations of a technique or multiple instantiations of a mechanism unless noted otherwise. Alternate implementations are included within the scope of various embodiments in which, for example, functions may be executed out of order from that shown or discussed, including substantially concurrently or in reverse order, depending on the functionality involved, as would be understood by those having ordinary skill in the art.

The apparatus of the present invention permits users to easily cook lasagna noodles and prevents the noodles from sticking to each other. As described above, noodles may be placed within the inventive apparatus for easy cooking. Once the noodles are cooked, the noodles may be easily removed from the apparatus without exposing the user to burn related risks.

Figure 1A:
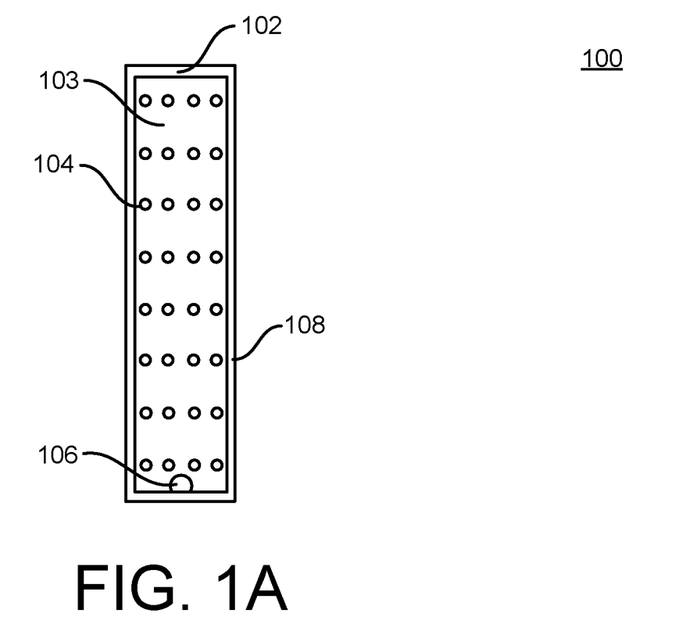
FIG. 1A illustrates, in a plan view, the inventive apparatus in accordance with one exemplary embodiment of the invention.

FIG. 1A illustrates the inventive apparatus 100 of the present invention in accordance with an embodiment of the invention. It is comprised of an insertion point 102, a retention portion 103, opening(s) 104, closure seals 108, and drainage element 106.

Now referring to FIG. 1A, the inventive apparatus is herein illustrated as element 100. The inventive apparatus 100 may be any shape or size sufficient to accommodate at least one lasagna noodle within its interior pocket. Lasagna noodles may be available in a variety of different shapes and sizes, and the apparatus 100 may be shaped and/or sized such that the lasagna noodle may fit inside an interior pocket of the apparatus 100 without having to be folded and/or otherwise rolled. As would be readily understood by persons of ordinary skill in the art, the apparatus 100 may be shaped and sized to accommodate the most commonly available lasagna noodles. In other instances, the apparatus 100 may be shaped to accommodate lasagna noodles of variety of different shapes and/or sizes. In one exemplary embodiment, an interior pocket of the inventive apparatus 100 may be approximately 3.5"×11.5" in width and length respectively.

Still referring to FIG. 1A, the inventive apparatus may be comprised of an insertion point 102. In accordance with an embodiment of the invention, the insertion point 102 is a portion of the apparatus 100 wherein lasagna noodles may enter and/or exit an interior portion of the apparatus 100. The insertion point 102 may be large enough to permit one or more lasagna noodles to enter and/or exit an interior pocket of the inventive apparatus 100. In one embodiment, the insertion point 102 is a slot and/or an opening for the lasagna noodle. The insertion point 102 may be further comprised of a enclosure mechanism that prevents lasagna noodles from accidentally exiting the apparatus 100. For example, the enclosure mechanism may be comprised of a flap or a fold-over portion that prevents the lasagna noodle from accidentally exiting the apparatus 100 when, for example, the apparatus is placed in boiling water. Other closure mechanisms, including but not limited to, buttons, hook-and-loop closure systems, ties, magnets, etc. may be used without departing from the scope of the invention.

The retention portion 103 serves a barrier between lasagna noodles that may be placed within the apparatus 100 and exterior items and/or surfaces. More specifically, the retention portion 103 prevents the lasagna noodle that is placed within the apparatus from substantially contacting other noodles when the apparatus and the noodle are placed in boiling water. The retention portion 103 may be flexible and/or semi-flexible such that it conforms to the shape of the lasagna noodle especially as it changes from an unflexible uncooked noodle to a flexible cooked noodle. In one instance, the material of the retention portion 103 may be the same material as used throughout the entire apparatus 100. The retention portion 103 and/or the apparatus 100 may be comprised of artificial and/or natural materials. In one embodiment of the invention, the retention portion 103 and/or the apparatus 100 is comprised of plastic, or other nontoxic synthetic material. Other synthetic material may be used, as would be readily apparent to a person of ordinary skill in the art, without departing from the scope of the invention. The sleeve may be US Food and Drug Administration compliant. In another embodiment of the invention, the retention portion 103 and/or the apparatus 100 may be comprised of natural materials, including, but not limited to bamboo, rice paper, seaweed, wood, foam, rubber etc. Other natural materials may be used, as would be readily apparent to a person of ordinary skill in the art, without departing from the scope of the invention. The material used may be selected to enable the apparatus to cook in materials other than water, including, but not limited to broth or other flavored liquid or is used to cook the noodle.

Still referring to FIG. 1A, the opening(s) 104 permit liquid and/or gases to flow in and out of the apparatus. The opening(s) 104 help ensure that the lasagna noodles that are placed within the apparatus 100 do not stick to the apparatus during the cooking process. Moreover, the opening(s) 104 help water and/or steam to flow in and out of the interior portion of the apparatus 100 to ensure that the noodle that is placed within the apparatus becomes adequately cooked by contacting hot liquids and/or gases. In one embodiment of the invention, the opening(s) 104 are small openings or apertures disposed within the surface of the apparatus 100 and/or the surface of the retention portion 103. Opening(s) 104 of a variety of different shapes, sizes, and quantities may be used without departing from the scope of the invention. In one instance, the opening(s) 104 are circular, as illustrated in FIG. 1A. However, other shapes may be used, as would be readily understood by a person of ordinary skill in the art, without departing from the scope of the invention. The opening(s) 104 may be of a variety of different sizes as well as long as they are small enough to prevent the lasagna noodles from accidently exiting the apparatus. FIG. 1A illustrates the opening(s) 104 as being tiny holes. However, other opening 104 sizes may be used without departing from the scope of the invention. FIG. 1A also illustrates numerous openings 104 disposed throughout the various surfaces of the apparatus 100. However, as would be readily understood by a person of ordinary skill in the art, the number of openings 104 may be greater than or less than the numbers illustrated in FIG. 1A.

In one embodiment of the invention, the opening(s) 104 may be optionally disposed on the apparatus 100. In instances wherein no opening(s) 104 are provided, the water in a cooking utensil may enter or exit the interior portion of the apparatus 100 via another opening, including, but not limited to the insertion point 102.

The closure seals 108 enclose the apparatus 100 throughout the perimeter of the apparatus except for around the insertion point 102. The closure seals ensure that the lasagna noodle(s) placed within the apparatus 100 do not exit the apparatus 100. Generally, the closure seals attache a top and a bottom surface of the apparatus 100 such that a lasagna noodle may not enter or exit the apparatus 100 via the closure seals 108. In accordance with one embodiment of the invention, the closure seals 108 may be comprised of, for example, glued, laminated, or otherwise attached surfaces that prevent a lasagna noodle from entering or exiting the apparatus through the closure seals 108. Other closure mechanism 108 may be used, as would be readily understood by a person of ordinary skill in the art, without departing form the scope of the invention.

Figure 3A:
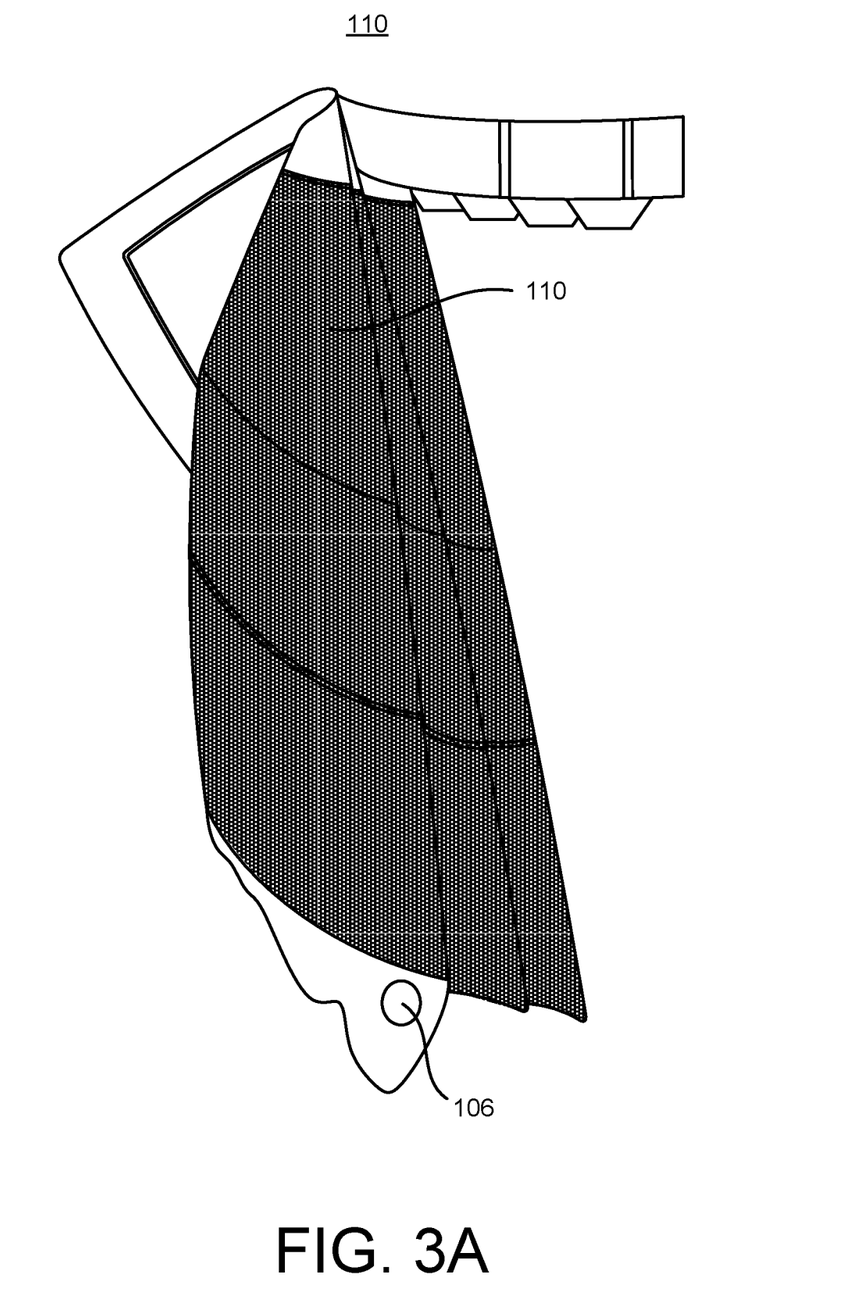
FIG. 3A illustrates an exemplary embodiment of the inventive apparatus, wherein the apparatus is removed from a cooking pot.

The drainage element 106 permits cooking-liquids, which may have entered the apparatus 100 during the cooking process via the opening(s) 104 and/or insertion point 102, to quickly exit the apparatus 100 when the apparatus is removed after cooking. FIG. 3A illustrates an exemplary embodiment of the apparatus as it is removed from a cooking utensil. When the device is removed as such, the drainage element 106 permits liquids and or gases to be removed from the apparatus. The drainage element 106 may be comprised of any opening, slot, and/or aperture that permits liquid and/or gases to flow out of the apparatus. Other types of drainage elements may be used, as would be readily understood to a person of ordinary skill in the art, without departing from the scope of the invention, including, but not limited to, a one way valve that permits liquids and/or gases to exit the apparatus but prevents liquids and/or gases from entering the apparatus, etc. In an instance where a user is cooking pasta in boiling water, the drainage element 106 permits the boiling water to exit the apparatus 100 when the user lifts the apparatus from the water.

In one embodiment of the invention, the apparatus may include a lifting element that can be used to lift the apparatus out of a cooking utensil. Examples of lifting elements include, but are not limited to hooks, rings, reinforced openings or apertures, or other similar elements that can be used to lift the apparatus from a cooking enclosure using available kitchen implements and or protective covering around a user's hand. In one embodiment, the apparatus may include a mating area that may connect with other kitchen utensils, such as tongs, spatulas, etc. The mating area helps a user to easily lift the apparatus from a cooking utensil without having the pour out hot liquids, which may be potentially dangerous to the user.

Figure 1B:
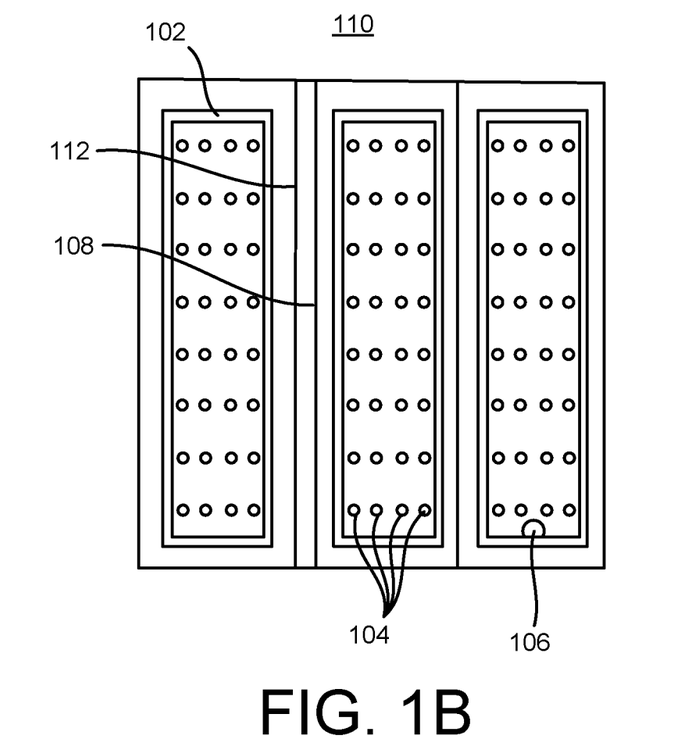
FIG. 1B illustrates, in a plan view, the inventive apparatus in accordance with one exemplary embodiment of the invention.

Now referring to FIG. 1B, which illustrates an inventive apparatus 110 of the present invention in accordance with another embodiment of the invention. As illustrated, multiple inventive apparatuses 100 may be connected together to form apparatus 110. Although only three apparatuses 100) are illustrated in FIG. 1B, one or more apparatuses 100 may be connected together within apparatus 110 without departing from the scope of the invention. A user may place multiple pasta noodles in the apparatus 110 and cook them together by, for example, placing the apparatus 110 and the noodles in boiling water.

Still referring to FIG. 1B, the apparatus 110 of the present invention nay be comprised of connection elements for connecting and/or separating the various apparatuses 100 that may be disposed within the inventive apparatus 110. In one embodiment of the invention, connection element 112 connects the apparatuses 100 together. In one embodiment of the invention, the connection element may be removably coupled together. For example, the connection element 112 may be perforated to permit a user to separate apparatuses 100 from each other. In other non-limiting examples, the connection element may be lined by zippers and/or hook and loop closure to enable the user to remove, attach, and/or reattach the apparatuses 100 as desired. In other non-limiting example, the connection element 112 may be comprised of adhesives to remove, connect, and/or reconnect apparatus 100 as desired. This functionality of the connection element 112 enables a user to use as many apparatuses 100 as necessary to cook a desired quantify of lasagna noodles.

Figure 2:
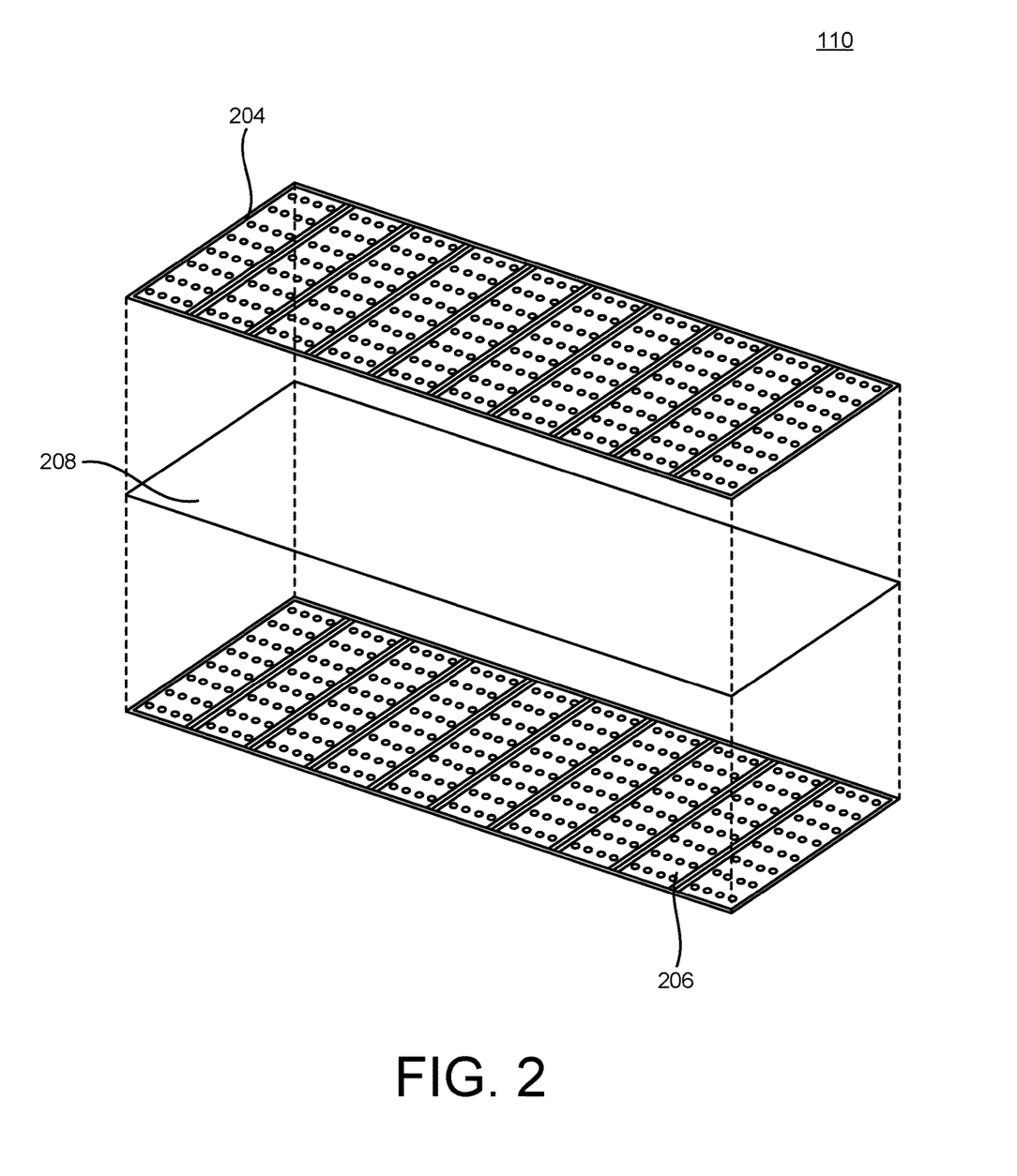
FIG. 2 illustrates, in an exploded view, the inventive apparatus in accordance with one exemplary embodiment of the invention.

Now referring to FIG. 2, which illustrates the inventive apparatus 110 in accordance with an embodiment of the invention. As shown in the figure, the apparatus 110 may be comprised of a top layer 204, a bottom layer 206, and a middle separation layer 208.

The top 204 and/or the bottom 206 layers enable may be comprised of retention portion 103. The opening(s) 104 may be disposed on one or more of the top 204 and the bottom 206 layers. The top 204 and the bottom 206 layers may be fused together at various locations by the closure seals 108 to create an interior pocket for a lasagna noodle. Once a noodle is placed within the interior pocket, the top 204 and the bottom 206 layers essentially separate the noodles form exterior materials such as other noodles and surfaces of cooking utensils.

In one embodiment of the invention, a middle layer 208 may be used to accommodate more than one lasagna noodle within the inventive apparatus 100. The middle layer 208 creates an additional separation within the interior pocket of the apparatus 100 such that one noodle may be placed in the interior space between the middle layer 208 and the top layer 204, and another noodle may be placed within the interior space between the middle layer 208 and the bottom layer 206. In accordance with the various embodiments described herein, the middle layer may be fused with the top layer 204 and the bottom layer 206 by the closure seal 108 such that an enclosed pocket is created around a lasagna noodle except for around the opening 102.

Although only one middle layer 208 is illustrated in FIG. 2, multiple middle layers 208 may be disposed between the top layer 204 and the bottom layer 206. Each additional middle layer 208 may create additional compartments within the inventive apparatus 100.

As illustrated in FIG. 2, the middle layer 206 may extend across the entire apparatus 110. However, as would be readily understood by a person of ordinary skill in the art, the middle layer may be separately disposed at each apparatus 100 and may be connectible and/or detachable from the apparatus 110 in accordance with the description herein.

Figure 3B:
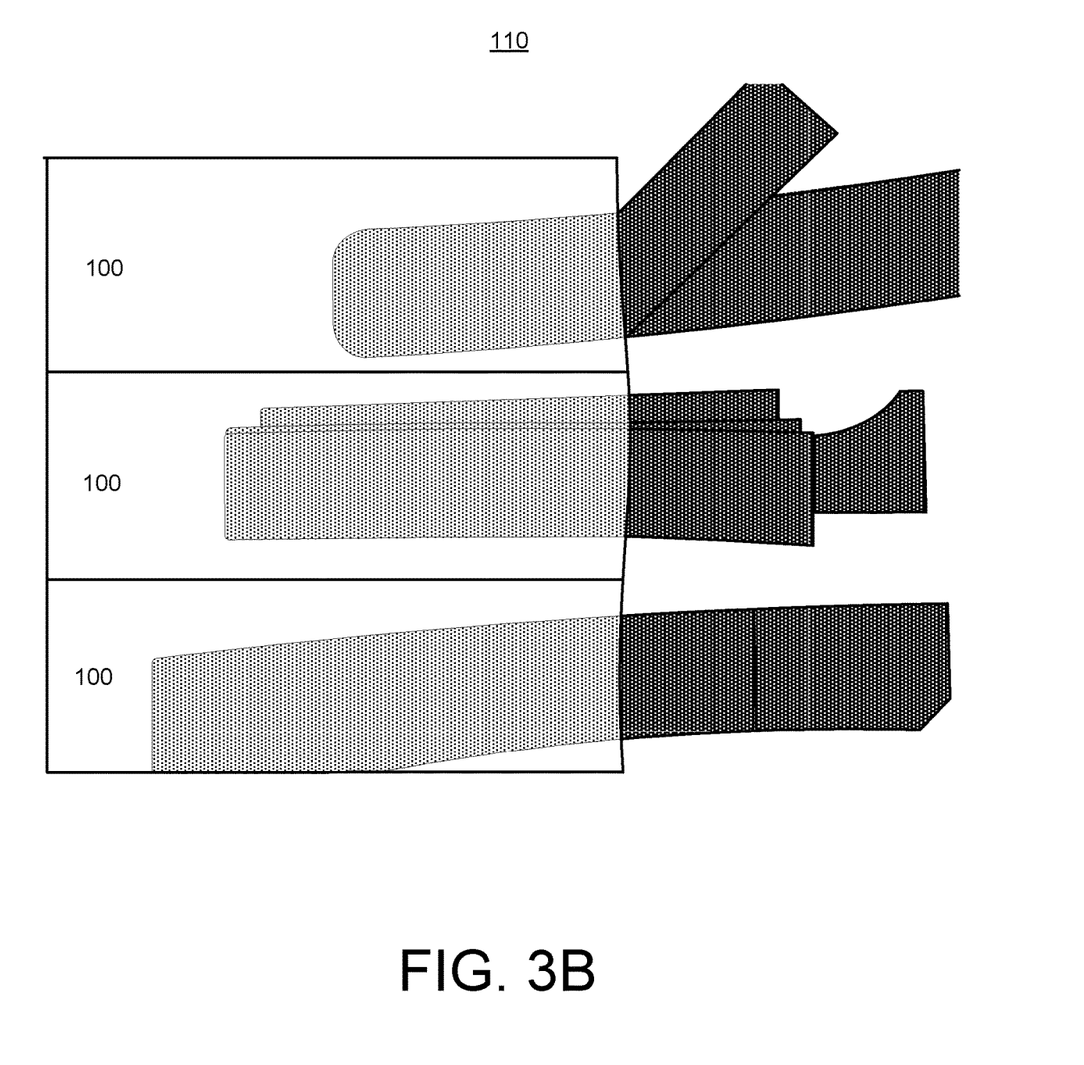
FIG. 3B illustrates an exemplary embodiment of the inventive apparatus, wherein noodles are removed from the apparatus after they have been cooked.

FIG. 3A and FIG. 3B illustrate the inventive apparatus 110 in various use cases. FIG. 3A illustrates the apparatus 110 as it is lifted from a cooking utensil containing cooking liquid. As shown, the inventive apparatus 110 (along with the noodles that are disposed within the apparatus 110 have a malleable shape because they are cooked. As illustrated, the liquid may be drained from the inventive apparatus 110 via drainage elements 106. Moreover, as illustrated, the inventive apparatus 110 may be removed from a cooking enclosure by tongs or other kitchen implements. Finally, as illustrated, the inventive apparatus 110 offers a safe and efficient way to remove hot liquids from the apparatus 110 without exposing the user to significant risk of burns, which may be caused by trying to pour hot liquids out of a cooking enclosure.

FIG. 3B illustrates a plurality of cooked lasagna noodles being removed from the inventive apparatus 110. As illustrated, the cooked noodles are easily removable from the apparatus 10o. The cooked noodles typically do not become broken nor do they stick to the apparatus and or other noodles 100 during the cooking process. As illustrated in FIG. 3B the noodles may be removed from the apparatus 100 via the opening 102. The cooked noodles that are removed from the apparatus 110 may be used to create a dish such as, but not limited to a lasagna dish.

Additional Considerations

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has." "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for creating an interactive message through the disclosed principles herein. Thus, while particular embodiments and applications have been illustrated and described, it is to be understood that the disclosed embodiments are not limited to the precise construction and components disclosed herein. Various apparent modifications, changes and variations may be made in the arrangement, operation and details of the method and apparatus disclosed herein without departing from the spirit and scope defined in the appended claims.

What is claimed is:

1. An apparatus for cooking lasagna noodles, the apparatus comprising:
    a top layer;
    a bottom layer;
    a middle layer disposed between the top layer and the bottom layer;
    enclosure seals for attaching the top layer, the middle layer, and the bottom layer together around a periphery of the apparatus;
    a first interior pocket between the top layer and the middle layer;
    a second interior pocket between the middle layer and the bottom layer, wherein each one of the interior pockets is sized and shaped to hold one lasagna noodle so that the lasagna noodles are prevented from sticking to each other during a cooking process;
    an insertion point creating an opening to access one of the interior pockets, wherein the insertion point being large enough to accommodate a lasagna noodle in at least one orientation; and
    openings disposed in the top layer and the bottom layer, wherein the openings permit fluids to enter and exit the interior pockets of the apparatus,
        wherein the insertion point further comprising an enclosure mechanism for preventing the lasagna noodle from accidentally exiting the apparatus,
        wherein the enclosure mechanism further comprising a flap that folds over the top layer at the insertion point to prevent the lasagna noodle from exiting the apparatus, and
        wherein the top layer, the bottom layer, and the middle layer are made of a flexible material.

2. The apparatus of claim 1, further comprising a drainage element for permitting fluids to enter and exit the apparatus.

3. The apparatus of claim 1, further comprising a connection element connecting the apparatus to other apparatuses along an edge of the apparatus.

4. The apparatus of claim 1, wherein the enclosure seals prevent fluids from entering and exiting the apparatus through the enclosure seals.

5. The apparatus of claim 1, wherein the openings comprise a plurality of openings disposed on the top layer and the bottom layer.

6. The apparatus of claim 1, wherein the openings are smaller than the length and the width of the lasagna noodle, the openings designed to prevent the lasagna noodle from exiting the apparatus through the openings.

7. The apparatus of claim 1, further comprising a lifting element for lifting the apparatus from a cooking enclosure.

8. The apparatus of claim 7, wherein the lifting element comprises a hook configured to mate to a kitchen utensil.

9. The apparatus of claim 3, wherein the connection element is perforated.

* * * * *